(12) United States Patent
Enkler et al.

(10) Patent No.: US 6,749,929 B1
(45) Date of Patent: Jun. 15, 2004

(54) HEAT-INSULATING AND SOUNDPROOFING LINING FOR AN ENGINE COMPARTMENT OF A MOTOR VEHICLE

(75) Inventors: Michael Fred Enkler, Ebersbach (DE); Michael Bopp, Witten (DE)

(73) Assignee: HP-Chemie Pelzer Research and Development Ltd., Waterford (IE)

( * ) Notice: Subject to any disclaimer, the term of this patent is extended or adjusted under 35 U.S.C. 154(b) by 0 days.

(21) Appl. No.: 09/709,743

(22) Filed: Nov. 13, 2000

Related U.S. Application Data

(63) Continuation-in-part of application No. PCT/EP99/03351, filed on May 14, 1999.

(30) Foreign Application Priority Data

May 14, 1998 (DE) .......................................... 198 21 532

(51) Int. Cl.⁷ .............................. B32B 3/26; B32B 3/00; E04B 1/82; E04B 1/84
(52) U.S. Cl. ................................ 428/304.4; 428/308.4; 428/315.9; 442/370; 442/373; 442/378; 442/381; 181/290; 181/286; 181/294
(58) Field of Search ................................ 442/370, 372, 442/373, 378, 381, 382; 428/304.4, 308.4, 315.9; 181/290, 286, 294

(56) References Cited

U.S. PATENT DOCUMENTS

| | | | |
|---|---|---|---|
| 4,540,717 A | * | 9/1985 | Mahnke et al. ................ 521/52 |
| 4,917,750 A | * | 4/1990 | Klose .......................... 156/254 |
| 5,527,598 A | * | 6/1996 | Campbell et al. ............ 428/251 |
| 6,145,617 A | * | 11/2000 | Alts ............................ 181/290 |

FOREIGN PATENT DOCUMENTS

| | | |
|---|---|---|
| DE | 8613009 | 12/1986 |
| DE | 8700919 | 4/1987 |
| DE | 3601204 | 7/1987 |
| DE | 3818301 A1 | 12/1989 |
| DE | 3922973 | 1/1990 |
| DE | 3840079 | 6/1990 |
| DE | 3818301 C2 | 11/1990 |
| DE | 9003347 | 9/1991 |
| DE | 8927 | 3/1993 |
| DE | 4128927 | 3/1993 |
| DE | 4211409 | 10/1993 |
| DE | 9314391 | 1/1994 |
| DE | 9419804 | 3/1995 |
| DE | 4409416 | 9/1995 |
| EP | 0683280 | 11/1995 |
| JP | 55-028813 | 2/1980 |

* cited by examiner

Primary Examiner—Cheryl A. Juska
Assistant Examiner—Lynda Salvatore
(74) Attorney, Agent, or Firm—Hunton & Williams LLP

(57) ABSTRACT

A heat-insulating an soundproofing lining for an engine compartment is disclosed, and a method of manufacturing the same, are disclosed. According to one embodiment of the present invention, the lining includes a first covering layer facing the engine. A duroplastic foam layer contacts the covering layer. A soundproofing layer contacts the duroplastic foam layer. A second covering layer contacts the soundproofing layer. According to another embodiment, a method of manufacturing a heat-insulating and soundproofing lining for an engine compartment is disclosed. The method includes the steps of (1) providing a first covering layer; (2) providing a duroplastic foam layer on the first covering layer; (3) providing a soundproofing layer on the first covering layer; (4) providing a second covering layer; and (5) pressing the layers together at an increased temperature and an increased pressure.

32 Claims, No Drawings

HEAT-INSULATING AND SOUNDPROOFING LINING FOR AN ENGINE COMPARTMENT OF A MOTOR VEHICLE

RELATED APPLICATIONS

The present application is a continuation-in-part of PCT/EP99/03351, entitled "Heat and Sound Insulating Shroud for the Engine Compartment of Motor Vehicles," filed May 14, 1999, which is based on German Patent Application DE 19821532, filed May 14, 1998, the disclosures of which are incorporated by reference in their entireties.

BACKGROUND OF THE INVENTION

1. Field of the Invention

The invention pertains to a heat-insulating and soundproofing lining for the engine compartments of motor vehicles and a process for the manufacturing thereof.

2. Description of the Related Art

In the engine compartments of motor vehicles, including both passenger and commercial vehicles, soundproofing parts in the form of absorbers are increasingly being used to reduce engine noise. In general, these absorbers are designed as molded articles to reduce the exterior and interior noise of vehicles. The molded articles may be made from webs (e.g., from cotton) or from polyurethane foam, and typically have thermostabilities up to about 160° C.

In certain areas, such as exhaust manifolds or exhaust gas recirculation areas, the molded articles may be subjected to high thermal loads. Thus, these molded articles are often laminated, partially or completely, with aluminum foil to serve as heat reflectors in order to protect the underlying nonwovens. Examples of such laminated articles are described in DE-U-87 00 919. The laminating, however, often results in the a loss of soundproofing for any component beneath the aluminum laminate, because sound cannot penetrate the aluminum foil and be absorbed.

DE 36 01 204 A describes an absorbing molded article consisting of several layers of nonwoven material that has been used for noise-reducing linings in the engine compartments of motor vehicles. The absorbing molded article consists of a covering layer of plastic fibers facing the engine, an adjacent heat-insulating and soundproofing layer of an inorganic, highly heatproof, fibrous material, and an additional absorbing layer of organic fibers.

DE 38 18 301 C also describes a noise-reducing molded article for the engine compartment of a motor vehicle in which an inorganic, highly heatproof, fibrous material bonded by a binder is covered by a fibrous carbon material by means of a bonding agent containing a melamine resin at the engine side. The molded article has a good noise reduction, and it is reportedly useful as a thermal insulation up to a temperature of about 500° C. In addition, it is planned to provide the molded article with a layer of carbon fibers. This carbon fiber layer is intended to provide a certain mechanical protection for the sensitive layer of inorganic fiber material.

DE 42 11 409 A1 describes a self-supporting, heat-insulating, and soundproofing lining for a combustion engine of a motor vehicle having several layers which have been compressed under the influence of pressure and heat with the formation of regions having a definably preset compression. The lining consists of a stronger, heat-insulating and soundproofing layer of an inorganic fiber material facing the engine which is covered by a fibrous carbon material. A stronger layer of an inorganic fibrous material opposite the engine cures to form a self-supporting backing. At the side facing the body, the backing may be covered by a layer of a polyester web or polyacrylonitrile fibers.

A heat-insulating and soundproofing lining on the basis of melamine resin foams covered with temperature-resistant covering layers on one or both sides has often been used in the automobile sector. According to DIN 4102, melamine resin foams are considered to be flame resistant, and are classified under class B1. A long-term heat resistance from −40° C. to 150° C. and a long-term heat loadability of 200° C. for three weeks render this material particularly suitable for the manufacturing of linings for the engine compartments of motor vehicles. This material, however, is extremely expensive.

SUMMARY OF THE INVENTION

Thus, it is the object of the invention to provide linings for the engine compartments of motor vehicles having comparable heat-insulating and soundproofing properties at costs distinctly reduced as against the state of the art.

According to one embodiment of the present invention, the aforementioned object is achieved by a heat-insulating and soundproofing lining for an engine compartment of a motor vehicle. According to one embodiment, the lining comprises a first covering layer facing the engine. A duroplastic foam layer having a long-term thermal stability up to 180° C., a long-term thermal loadability at 200° C. of three weeks and a thickness below 5 mm, contacts the first covering layer. Next, a soundproofing layer of plastic foam, particle composite foam or web consisting of natural or synthetic fibers and mixtures thereof, needled or non-needled, is in contact with the duroplastic foam layer layer. Finally, a second covering layer is in contact with the soundproofing layer, and is opposite the engine side.

Thus, the lining parts of the invention are especially suited for the lining of built-in components, body components and the like of motor cars, heat-radiating machines and units, in particular of sound-absorbing elements for the protection against excessive thermal loads due to machine guides, catalyst components and the like, in particular within the engine compartment of motor vehicles.

DESCRIPTION OF THE PREFERRED EMBODIMENT

The present invention replaces, at least partially, the relatively expensive duroplastic foam material of the foam layer of a soundproofing lining with more cost-efficient materials without a deterioration in the heat-insulating and soundproofing properties of the lining. In addition, the present invention does not cause a degradation of the thermal behavior of the soundproofing lining. For example, a suitable soundproofing lining for a front engine hood reduces the sound propagation through the front engine hood. The geometry of the lining parts may depend on the interior surface of the front engine hood and the spatial conditions within the engine compartment. The fastening of the lining parts may be effected by, for example, plugging in a hole pattern on the inner surface of the front engine hood. The lining may be secured by a split rivets. According to the invention, lining parts may be installed between the body and the engine in the area of the bulkhead within the engine compartment. The lining parts may be secured at the body by coarse-thread bolts or snap fasteners (or sheet nuts).

In general, the lining of the present invention comprises several layers. These layers include a first covering layer, a duroplastic foam layer, a soundproofing layer, and a second covering layer. The layers will be discussed in greater detail, below.

The first covering layer is the layer of the liner that faces the engine. In general, this layer comprises high-temperature resistant fibrous structures on the basis of inorganic fibers are suited. Especially preferred within the meaning of the present invention are nonwovens, fabrics, or knit fabrics of the above-mentioned fibers. According to the invention, in addition to polyester webs, glass fiber mats and/or carbon fiber mats, ceramic fiber mats, or mineral fiber mats are particularly preferred. Textile glass fibers, within the meaning of the present invention, includes fibers and filament yarns from vitreous melts of sodium, potassium and other silicates produced by the jet screen (filament yarns), bar screen (filament yarn and fiber) or the jet glass processes (fibers). The nonflammability of glass fibers, the high heat resistance, brittleness and the low wear resistance thereof are distinctive. They have a very high tensile strength, a low elasticity and are rotproof.

Mineral silicate fibers are mineral fibers obtained from melts of natural silicates or mixtures thereof with silicates, such as calcium, aluminum, or magnesium silicates. Mineral silicate fibers are very fine and smooth and have a spherical cross section and an amorphous structure. The thermal conductivity of mineral silicate fibers is low, they are incombustible, and, like glass, are resistant to all normally occurring chemical influences. Since the fibers cannot be spun solely, they are employed in the form of mats or similar forms mainly for high-temperature isolating purposes already in the art.

Ceramic fibers, within the meaning of the present invention, include inorganic manmade fibers and filament yarns made from silica, rayon, or with amounts of oxides, for example, of iron, aluminum, magnesium, and/or calcium oxides.

The ceramic fibers are usually classified as quartz fibers, ceramic fibers of the A, G, and V types.

Quartz fibers have a smooth surface, glassy structures and spherical cross sections. Quartz fibers are chemically resistant to all common chemicals. They are used for filter materials employed at high temperatures and in aggressive media, as insulating material in rockets, jet plane engines, nuclear power plants, blast furnaces and the like. A-type ceramic fibers have properties corresponding approximately to those of quartz fibers. The properties of G-type ceramic fibers correspond, approximately, to those of quartz fibers. They are stable up to 1000° C. and have good electrical insulating properties at high temperatures, and they are the only material having electrical insulating properties in the form of textiles.

Depending on the degree of combustion of the viscous support material, the properties of type-IV ceramic fibers can vary widely. They are used in the form of filaments, fabrics, knit fabrics, webs for high-temperature insulators of thermal shields used in space and on blast furnaces, in jet plane engines, rockets and the like.

Carbon fibers, within the meaning of the present invention, include inorganic fibers and filament yarns obtained by a structural transformation of organic fibers in a pyrolysis. Depending on the carbon amount and the temperature employed in the pyrolysis, the carbon fibers are classified as partially carbonized carbon fibers, carbonized carbon fibers, and graphite fibers. Carbon fibers are often used in the form of fibers and filaments for the reinforcement of plastics, as electrical insulating material, for reinforcing metals, building materials, materials for space flights, rockets etc.

In addition to the above-mentioned inorganic fibers, metallic fibers may be used in the textile materials. However, because metal fibers have a high thermal conductivity, so metal fibers are employed for the textile material only in small amounts.

Especially preferably within the meaning of the present invention the textile materials of first cover layer contain carbon fibers.

The layer thicknesses of the respective layers can be varied within a wide range depending on space constraints or other requirements. Thus, within the meaning of the present invention, the layer thickness of the textile materials is particularly preferably from 0.5 to 1.5 mm. In addition, the mass per unit area of the textile material is particularly preferably from 30 to 200 $g/m^2$. In particular, the textile material serves as a mechanical protection of the duroplastic foam layer, which—as is generally known—has a low stability. The oleophobic and hydrophobic characters of the fibers protect the other layers within the lining.

The second layer is the duroplastic foam layer. According to one embodiment of the present invention, the duroplastic foam layer includes a flexible, open-cell foam of melamine resin. An example of a suitable material is Basotect7. This is a flexible, open-cell foam of melamine resin, a duroplastic plastic of the aminoplast group. The filigree, three-dimensional structure of the foam consists of narrow and with that easily deformable webs.

The first covering layer and the duroplastic foam layer have an attractive profile of properties, including:

a high sound absorbency long-term thermal stability: 200° C.

fire behavior: B1 according to DIN 4102 bulk density: 10 $kg/m^3 \pm 1.5$ $kg/m^3$ thermal conductivity 'lambda'$_{10}$·<0.035 W/mK a high flexibility shaping by pressing and cutting good operating ability Usually, the fabricator will obtain the material in the form of blocks, and produce molded articles for various applications by cutting and pressing. The versatile profile of properties result in a broad range of applications. The true advantages of the product ensue from the combination of various properties.

The third layer is the soundproofing layer. According to one embodiment of the present invention, the soundproofing layer may include, for example, plastic foam or particle compound foam. A plastic foam within the meaning of the present invention preferably comprises semi-rigid polyurethane foam having a volumetric weight from 6 to 30 $kg/m^3$, in particular from 7 to 12 $kg/M^3$, and ester- or ether-based flexible polyurethane foam 10 having a volumetric weight from 10 to 60 $kg/m^3$, in particular from 12 to 30 $kg/m^3$, or particle compound foam on the basis of ester- or ether-based semi-rigid polyurethane foam and flexible polyurethane foam having a volumetric weight from 30 to 250 $kg/m^3$, in particular from 40 to 80 $kg/m^3$.

The soundproofing layer may include nonwoven fabrics. Nonwoven fabrics, a material of construction having a wide range of properties, have often been used in the automobile sector. For example, phenolic bonded nonwoven fabrics have been used in the automotive industry for a long time because of, inter alia, their good damping characteristics as a material for load-bearing and lined parts (in a pure form or as a composite) in the construction of passenger cars and trucks.

Phenolic bonded nonwoven fabrics are commercially available in bulk densities from 50 to 1000 kg/m$^3$ in thicknesses from 5 to 30 mm. It is to be described as a porous composite consisting of three phases (cotton, cured phenolic resin, and air)—a material of construction, the profile of properties of which can be modified extensively. Cotton provides the fibrous form, whereas the phenolic resin exists in a spot-like, linear, or also net-flat manner in a kind of matrix.

The acoustic properties and the strength of the composite may be controlled by selecting the nonwoven fabrics suitably. Preferred materials for manufacturing the nonwoven include glass fiber, or glass gauze-reinforced fibrous materials, in particular, binder-containing nonwoven fabrics, preferably those consisting of a blended cotton fabric. These nonwovens are provided with the required strength by pressing at elevated temperatures.

The particular properties and the performance of the last-mentioned product group can be explained by the chemical and morphological structure of cotton and the duroplastic nature of the cured phenolic resins generally used as binders for blended cotton nonwoven fabrics. Further quantities of influence are the formability, the pressability of cotton, the statistical occurrence of bonding points and the laminating and/or sheathing effect of the binder molecules which adhere lengthwise to the fibers and which are also condensated in this form.

The cotton withstands the manufacturing process without any significant change of its physical-chemical characteristics. It imparts to the product special features of quality such as sound-absorptive capacity, good mechanical strength values, impact strength, and cold shatter strength.

Preferred binders for the nonwovens include phenol formaldehyde resins, epoxy resins, polyester resins, polyamide resins, polypropylene, polyethylene, and/or ethyl vinyl acetate copolymers. After curing, phenolic resins have the typical duroplastic properties which are transferred to the final product. Normally, the nonwoven fabric is manufactured from reprocessed cotton and powdery phenolic. resin by a dry method. The curing is performed either in the heating channel, or in the uncured semifinished product as an intermediate product within the press. For the parts used within the passenger compartment, selected textiles may be used.

Nonwoven fabrics, within the meaning of the present invention, in additional to conventional binders, may contain natural fibers, such as cotton, flax, jute, linen, as well as synthetic fibers, such as polybutylene terephthalates, polyethylene terephthalates, nylon 6, nylon 66, nylon 12, viscose, or rayon as textile fiber. The type and amount of the binders to be used may be determined by the purpose of application of the nonwoven fabrics. Thus, using from 5 to 50% by weight, in particular from 20 to 40% by weight of binder, based on the nonwoven fabric, is generally preferred. According to the invention, using nonwoven fabrics having a surface density from 800 to 2000 g/m$^2$ is especially preferred.

Preferably the layer thickness of the soundproofing layer is less than 20 mm, and in particular less than 10 mm.

In one embodiment, the duroplastic foam layer and the soundproofing layer may have a grid-like shaping, in particular, at the boundary surface of the layers. Preferably, the shaping is performed from one side. For example, it may consist of convex bulges on the side having tapered or pyramidal shapes. Exceptional acoustic values may be attained by a material and cost saving "knob cutting technique" via a hollow chamber principle.

As a matter of course, the heat transfer coefficient and the acoustic properties may be controlled within a wide range by varying the layer thickness.

Similar to the first covering layer, the second covering layer serves to protect the lining from mechanical damage. For the second covering layer, it is especially preferred to use, for example, thin needle-punched or spunbonded nonwovens in order to protect the lining from contamination. In one embodiment, the weight per unit area of the second covering layer is from 30 to 200 g/m$^2$.

The molded articles of the invention are preferably used in the bulkhead area of engine compartments or in the transmission tunnel area of motor vehicles.

The molded articles of the invention may be manufactured by a thermosetting process enabling the further use of tools and production equipment known in the art with a necessary adaptation of the starting materials. Especially preferred within the meaning of the present invention, the linings arc manufactured by pressing and adhering the textile article with the duroplastically bonded nonwoven fabric under the influence of the duroplastic binder. Here, only the contacting areas are bonded.

In another embodiment of the present invention, the first covering layer facing the engine may be covered, either partially or completely, with a metal foil in the area of the increased thermal load. Usually, with known absorbers, the layer thickness of the aluminum foil may be 250 $\mu$m or more. In addition, aluminum foils having a thicknesses from 50 to 500 $\mu$m may also be used. According to one embodiment of the present invention, it is preferred to use aluminum foil having a thicknesses from 50 to 100 $\mu$m. The low thicknesses may be used since the other components of the laminate of the invention are also capable of performing static functions.

By means of an optional perforation of the aluminum foil, the heat reflecting effect of the aluminum foil is maintained; however, a transmittance for acoustic waves is achieved in this area so that the aluminum foil-cladded side of the duroplastic materials facing the source of sound maintains the acoustic activity thereof.

According to the present invention, the first covering layer, the duroplastic foam layer, the sound proofing layer, the second covering layer, and the optional aluminum layer may be bonded by adhesives to one another. In a preferred embodiment of the present invention, a hot melt powder, such as a phenolic resin powder or a hot-melt adhesive sheet, may be provided as an adhesive between the duroplastic foam layer and the soundproofing layer.

In the wheel housing area of the engine compartment, the lining parts according to the present invention face the engine in the air inlet space. The lining parts prevent the engine noise traveling into the passenger compartment, and may be fastened by fasteners, such as coarse-thread bolts and/or snap fasteners (e.g., sheet nuts). Within the bulkhead area of the engine compartment, the lining parts of the invention may be used for covering the body-in-white from the crossmember bulkhead or the windscreen gap to the tunnel level in order to seal the underside paneling. Optionally, the lining parts may comprise openings for air conditioning tubes. In the exterior area of the tunnel, the lining parts may also be inserted between the transmission or the exhaust system and the floor pan. According to one embodiment of the present invention, these lining parts may also be fastened with fasteners, such as coarse-thread bolts and/or snap fasteners.

When using the lining parts of the invention in the area of the cowl plenum top, the cowl plenum top is covered and the lining part is secured at the cowl plenum. It is positioned above the left hand or right hand bulkhead of the engine compartment.

During the specified use a decrease of the stability below the starting value under the influence of heat does not occur.

The maximum permissible temperature of the lining parts at the side averted from the sheet metal and facing the engine has the same order of magnitude as that of lining parts consisting exclusively of melamine resin layers coated on one or both sides.

EXAMPLE EMBODIMENT

A sound adsorbing layered structure was formed using a polyester web as a first covering layer. The polyester web had a weight per unit area of about 120 g/m², and a adhesive coating. The duroplastic foam layer comprised a 3 mm thick melamine resin foam having a density of 10 kg/m³. The soundproofing layer comprised a 7 mm thick layer of particle compound foam. The second covering layer was bonded to the soundproofing layer, and comprised another polyester web having a weight per unit area of 120 g/m².

The starting materials ware pressed with one another in a three-dimensional pressing tool at elevated pressure (a press having a clamping force of 80 t; 120 s) and elevated temperature (190° C.) to yield a molded article, whereby the layer thicknesses mentioned above could be attained.

The layered structure produced this way resisted a thermal load of 200 20 C., which is comparable with an engine-side thermal load of the same temperature for more than 3 weeks without any noticeable change.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. All references cited herein for any reason, including all U.S. Patents, are specifically and entirely incorporated by reference. It is intended that the specification is considered as exemplary only, with the true scope and spirit of the invention being indicated by the following claims.

We claim:

1. A heat-insulating and soundproofing lining for attachment to a surface in an engine compartment of a motor vehicle, comprising:

a first covering layer adapted positioned for exposure to an engine compartment thermal environment when the lining is attached to the surface, the first covering layer comprising at least one of a polyester web, a glass fiber web, a carbon fiber web, a ceramic fiber web, and a mineral fiber web;

a duroplastic foam layer bonded to the first covering layer, wherein the duroplastic foam layer includes a flexible, open-cell foam of melamine resin and has a long-term thermal loadability at 200° C. of three weeks;

a soundproofing layer bonded to the duroplastic foam layer, wherein the soundproofing layer is selected from the group consisting of plastic foam, particle composite foam, and a non woven fabric wherein the non woven fabric consists of at least one of natural fibers and synthetic fibers; and a second covering layer bonded to the soundproofing layer and positioned for contact with the surface when the lining is attached to the surface, the second covering layer comprising at least one of a ployester web, a glass fiber web, a carbon fiber web, a ceramic fiber web, and a mineral fiber web.

2. The heat-insulating and soundproofing lining of claim 1, wherein the duroplastic foam layer has a long-term thermal stability up to 180° C. and a thickness of less than 5 mm.

3. The heat-insulating and soundproofing lining of claim 1, wherein the natural fibers and synthetic fibers are needled.

4. The heat-insulating and soundproofing lining of claim 1, wherein the natural fibers and synthetic fibers are non-needled.

5. The heat-insulating and soundproofing lining of claim 1, wherein the second covering layer comprises at least one of a thin needle-punched nonwovens and spunbonded non-wovens.

6. The heat-insulating and soundproofing lining of claim 1, wherein the second covering layer has in a weight per unit area from 30 to 200 g/m².

7. The heat-insulating and soundproofing lining of claim 1, wherein the soundproofing layer is a plastic foam and has a volumetric weight from about 6 to about 30 kg/m².

8. The heat-insulating and soundproofing lining of claim 1, wherein the soundproofing layer is a particle composite foam and has a volumetric weight from about 30 g/m³ to about 250 g/m³.

9. The heat-insulating and soundproofing lining of claim 1, wherein the soundproofing layer is a nonwoven fabric and has a volumetric weight from about 800 g/m³ to about 2000 g/m³.

10. The heat-insulating and soundproofing lining of claim 1, wherein the soundproofing layer has a thickness of less than 20 mm.

11. The heat-insulating and soundproofing lining of claim 10, wherein the soundproofing layer has a thickness of less than 10 mm.

12. The heat-insulating and soundproofing lining of claim 1, wherein at least one surface of at least one of the duroplastic foam layer and the soundproofing layer is formed with a pattern of convex bulges.

13. The heat-insulating and soundproofing lining of claim 1, wherein the pattern of convex bulges is formed as a grid.

14. The heat-insulating and soundproofing lining of claim 1, further comprising a metal foil bonded to the first covering layer.

15. The heat-insulating and soundproofing lining of claim 1, wherein the first covering layer, the duroplastic foam layer, the soundproofing layer, and the second covering layer are joined by adhesive layers.

16. The heat-insulating and soundproofing lining of claim 14, wherein the first covering layer, the duroplastic foam layer, the soundproofing layer, the second covering layer, and the metal foil are joined by adhesive layers.

17. A method for manufacturing a heat-insulating and soundproofing lining for attachment to a surface in an engine compartment of a motor vehicle, comprising:

providing a first covering layer comprising at least one of a polyester web, a glass fiber web, a carbon fiber web, a ceramic fiber web, and a mineral fiber web;

providing a duroplastic foam layer on the first covering layer, wherein the duroplastic foam layer comprises a flexible, open-cell foam of melamine resin and has a long-term thermal loadability at 200° C. of three weeks;

providing a soundproofing layer on the duroplastic foam layer, the soundproofing layer being formed from one of the group consisting of plastic foam, particle composite foam, and a non woven fabric consisting of at least one of natural fibers and synthetic fibers;

providing a second covering layer on the soundproofing layer, the second covering layer being positioned for contact with the surface in the engine compartment when the lining is attached to the surface, the second covering layer comprising at least one of a polyester web, a glass fiber web, a carbon fiber web, a ceramic fiber web, and a mineral fiber web;

pressing the layers together at an increased temperature and an increased pressure.

18. The method of claim 17, further comprising:
providing an adhesive between the layers.

19. The method of claim 17, further comprising bonding a metal foil to the first covering layer.

20. The method of claim 17, wherein the duroplastic foam layer has a long-term thermal stability up to 180° C. and a thickness of less than 5 mm.

21. The heat-insulating and soundproofing lining of claim 1, wherein the first covering layer and the duroplastic foam layer have a bulk density in a range from 8.5 kg/m³ to 11.5 kg/m³.

22. The heat-insulating and soundproofing lining of claim 1, wherein the first covering layer and the duroplastic foam layer have a thermal conductivity no greater than 0.035 W/mK.

23. A heat-insulating and soundproofing lining for attachment to a surface in an engine compartment of a motor vehicle, the lining comprising:

a first covering layer positioned for exposure to an engine compartment thermal environment when the lining is attached to the surface, the first covering layer comprising at least one of a polyester web, a glass fiber web, a carbon fiber web, a ceramic fiber web, and a mineral fiber web;

a duroplastic foam layer bonded to the first covering layer, wherein the duroplastic foam layer includes a flexible, open-cell foam and has a long-term thermal loadability at 200° C. of three weeks, the first covering layer and the duroplastic foam layer having a bulk density in a range from 8.5 kg/m³ to 11.5 kg/m³ and thermal conductivity less than or equal to 0.035 W/mK;

a soundproofing layer bonded to the duroplastic foam layer, wherein the soundproofing layer is selected from the group consisting of plastic foam, particle composite foam, and a non woven fabric; and a second covering layer bonded to the soundproofing layer and positioned for contact with the surface when the lining is attached to the surface, the second covering layer comprising at least one of a polyester web, a glass fiber web, a carbon fiber web, a ceramic fiber web, and a mineral fiber web.

24. The heat-insulating and soundproofing lining of claim 23, wherein the duroplastic foam layer has a long-term thermal stability up to 180° C. and a thickness of less than 5 mm.

25. The heat-insulating and soundproofing lining of claim 23, wherein the duroplastic foam layer comprises a flexible, open-cell foam of melamine resin.

26. The heat-insulating and soundproofing lining of claim 23, further comprising a metal foil bonded to the first covering layer.

27. A heat-insulating and soundproofing lining for attachment to a surface in an engine compartment of a motor vehicle, the lining comprising:

a first covering layer positioned for exposure to an engine compartment thermal environment when the lining is attached to the surface, the first covering layer comprising at least one of a polyester web, a glass fiber web, a carbon fiber web, a ceramic fiber web, and a mineral fiber web;

a duroplastic foam layer bonded to the first covering layer, the duroplastic foam layer comprising a flexible, open-cell foam and having a long-term thermal loadability at 200° C. of three weeks;

a soundproofing layer bonded to the duroplastic foam layer, the soundproofing layer being formed from one of a plastic foam having a volumetric weight in a range from about 6 kg/m³ to about 30 kg/m³ and a particle composite foam having a volumetric weight in a range from about 40 kg/m³ to about 80 kg/m³; and a second covering layer bonded to the soundproofing layer and positioned for contact with the surface when the lining is attached to the surface, the second covering layer comprising at least one of a polyester web, a glass fiber web, a carbon fiber web, a ceramic fiber web, and a mineral fiber web.

28. The heat-insulating and soundproofing lining of claim 27, wherein the first covering layer and the duroplastic foam layer have a bulk density in a range from 8.5 kg/m³ to 11.5 kg/m³.

29. The heat-insulating and soundproofing lining of claim 27, wherein the first covering layer and the duroplastic foam layer have a thermal conductivity no greater than 0.035 W/mK.

30. The heat-insulating and soundproofing lining of claim 27, wherein the duroplastic foam layer has a long-term thermal stability up to 180° C. and a thickness of less than 5 mm.

31. The heat-insulating and soundproofing lining of claim 27, wherein the duroplastic foam layer comprises a flexible, open-cell foam of melamine resin.

32. The heat-insulating and soundproofing lining of claim 27, further comprising a metal foil bonded to the first covering layer.

* * * * *

UNITED STATES PATENT AND TRADEMARK OFFICE
CERTIFICATE OF CORRECTION

PATENT NO. : 6,749,929 B1
DATED : June 15, 2004
INVENTOR(S) : Michael Fred Enkler et al.

It is certified that error appears in the above-identified patent and that said Letters Patent is hereby corrected as shown below:

Column 7,
Lines 46-54, please delete and insert the following:
-- 1. A heat-insulating and soundproofing lining for attachment to a surface in an engine compartment of a motor vehicle, comprising:
 a first covering layer positioned for exposure to an engine compartment thermal enviornment when the lining is attached to the surface, the first covering layer comprising at least one of a polyester web, a glass fiber web, a carbon fiber web, a ceramic fiber web, and a mineral fiber web; --.

Signed and Sealed this

Eighteenth Day of January, 2005

JON W. DUDAS
*Director of the United States Patent and Trademark Office*